United States Patent
Yeap (10) Patent No.: US 8,966,400 B2
(45) Date of Patent: Feb. 24, 2015

(54) USER MOVEMENT INTERPRETATION IN COMPUTER GENERATED REALITY

(75) Inventor: Tralvex Yeap, Central Meadows (SG)

(73) Assignee: Empire Technology Development LLC, Wilmington, DE (US)

( * ) Notice: Subject to any disclaimer, the term of this patent is extended or adjusted under 35 U.S.C. 154(b) by 563 days.

(21) Appl. No.: 12/795,110

(22) Filed: Jun. 7, 2010

(65) Prior Publication Data

US 2011/0302536 A1    Dec. 8, 2011

(51) Int. Cl.
*G06F 3/048* (2013.01)
*G06F 3/038* (2013.01)

(52) U.S. Cl.
CPC ..................................... *G06F 3/038* (2013.01)
USPC ........................... 715/848; 715/852; 715/863

(58) Field of Classification Search
CPC . G06F 3/04845; G06F 17/3028; G06F 3/048; G06F 3/011; G06F 3/04815; G06F 3/017
USPC ................. 715/757, 782, 848–852, 863, 787; 345/158, 184
See application file for complete search history.

(56) References Cited

U.S. PATENT DOCUMENTS

| | | | |
|---|---|---|---|
| 5,347,295 A | 9/1994 | Agulnick et al. | |
| 5,555,354 A * | 9/1996 | Strasnick et al. | 345/427 |
| 5,596,656 A | 1/1997 | Goldberg | |
| 6,121,969 A * | 9/2000 | Jain et al. | 715/850 |
| 6,181,343 B1 * | 1/2001 | Lyons | 715/850 |
| 6,908,386 B2 * | 6/2005 | Suzuki et al. | 463/30 |
| 7,158,118 B2 * | 1/2007 | Liberty | 345/158 |
| 7,603,631 B2 * | 10/2009 | Bermudez et al. | 715/848 |

(Continued)

FOREIGN PATENT DOCUMENTS

| | | |
|---|---|---|
| CN | 1845051 | 10/2006 |
| CN | 1919396 | 2/2007 |

(Continued)

OTHER PUBLICATIONS

Ware et al., "Exploration and Virtual Camera Control in Virtual Three Dimensional Environments", Proceedings of the 1990 Symposium on Interactive 3D Graphics (I3D'90), pp. 175-183, copyright ACM 1990.*

(Continued)

*Primary Examiner* — Andrew Tank
(74) *Attorney, Agent, or Firm* — Moritt Hock & Hamroff LLP; Steven S. Rubin, Esq.

(57) ABSTRACT

Technologies are generally described for a system for interpreting user movement in computer generated reality. In some examples, the system includes a user interface effective to generate movement data relating to movement of the user interface. In some examples, the system further includes a processor receive the movement data. In some examples, the processor is further effective to define a coordinate system based on the movement data and map the movement data to the coordinate system to produce mapped movement data. In some examples, the processor is further effective to determine a feature of the mapped movement data and to map the feature to a code. In some examples, the processor is further effective to send the code to the application and receive application data from the application in response to the code. In some examples, the processor is further effective to generate an image based on the application data.

8 Claims, 8 Drawing Sheets

(56) References Cited

U.S. PATENT DOCUMENTS

| | | | |
|---|---|---|---|
| 7,640,515 B2* | 12/2009 | Balakrishnan et al. | 715/848 |
| 7,683,883 B2* | 3/2010 | Touma et al. | 345/163 |
| 7,774,155 B2* | 8/2010 | Sato et al. | 702/127 |
| 7,889,195 B2* | 2/2011 | Shih et al. | 345/419 |
| 8,032,842 B2* | 10/2011 | Kwon et al. | 715/850 |
| 8,166,421 B2* | 4/2012 | Magal et al. | 715/863 |
| 8,249,334 B2* | 8/2012 | Berliner et al. | 382/154 |
| 8,310,656 B2* | 11/2012 | Zalewski | 356/29 |
| 8,686,991 B2* | 4/2014 | Fitzmaurice et al. | 345/419 |
| 2005/0081633 A1 | 4/2005 | Nasiri et al. | |
| 2005/0082252 A1 | 4/2005 | Nasiri et al. | |
| 2005/0166677 A1 | 8/2005 | Nasiri et al. | |
| 2006/0101354 A1 | 5/2006 | Hashimoto et al. | |
| 2006/0208326 A1 | 9/2006 | Nasiri et al. | |
| 2006/0219006 A1 | 10/2006 | Nasiri et al. | |
| 2006/0227106 A1 | 10/2006 | Hashimoto et al. | |
| 2006/0228831 A1 | 10/2006 | Nasiri et al. | |
| 2007/0012653 A1 | 1/2007 | Nasiri et al. | |
| 2007/0066394 A1 | 3/2007 | Ikeda et al. | |
| 2007/0113653 A1 | 5/2007 | Nasiri et al. | |
| 2007/0180908 A1 | 8/2007 | Seeger et al. | |
| 2007/0265082 A1 | 11/2007 | Shimura et al. | |
| 2007/0270217 A1 | 11/2007 | Rabin | |
| 2008/0115579 A1 | 5/2008 | Seeger et al. | |
| 2008/0283990 A1 | 11/2008 | Nasiri et al. | |
| 2008/0287189 A1 | 11/2008 | Rabin | |
| 2008/0291160 A1 | 11/2008 | Rabin | |
| 2008/0293492 A1 | 11/2008 | Jawad et al. | |
| 2008/0314147 A1 | 12/2008 | Nasiri et al. | |
| 2009/0005166 A1 | 1/2009 | Sato | |
| 2009/0007661 A1 | 1/2009 | Nasiri et al. | |
| 2009/0076766 A1* | 3/2009 | Fein et al. | 702/150 |
| 2009/0077501 A1 | 3/2009 | Partridge et al. | |
| 2009/0114016 A1 | 5/2009 | Nasiri et al. | |
| 2009/0145225 A1 | 6/2009 | Nasiri et al. | |
| 2009/0184849 A1 | 7/2009 | Nasiri et al. | |
| 2009/0193892 A1 | 8/2009 | Seeger | |
| 2009/0209346 A1 | 8/2009 | Cheng et al. | |
| 2010/0053304 A1* | 3/2010 | Underkoffler et al. | 348/42 |
| 2010/0235786 A1* | 9/2010 | Maizels et al. | 715/810 |
| 2010/0261526 A1* | 10/2010 | Anderson et al. | 463/31 |
| 2011/0107270 A1* | 5/2011 | Wang et al. | 715/850 |

FOREIGN PATENT DOCUMENTS

| | | |
|---|---|---|
| EP | 1710670 | 10/2006 |
| EP | 1710670 | 10/2007 |
| EP | 2016360 | 11/2007 |
| EP | 2080538 | 7/2009 |
| EP | 2090346 | 8/2009 |
| JP | 2006-293476 | 10/2006 |
| JP | 2006-293477 | 10/2006 |
| JP | 2006293476 | 10/2006 |
| JP | 2006293477 | 10/2006 |
| WO | 2007133527 | 11/2007 |

OTHER PUBLICATIONS

Shimada et al., (2008) "Gesture Recognition using Sparse Code of Hierarchial SOM"; pp. 1-4.

Buxton, W., (2010) "Marking Interfaces"; Haptic Input Chapter 13. http://slholmes.org/blog/?p=229 (2010), pp. 1-7.

(2010) "Mobile Sign Language Recognition"; http://www.cc.gatech.edu/ccg/projects/asl/; pp. 102.

Video: "LiveMove2" (2008); Alive Inc.

Video: "Gyroscopes and Accelerometers Compared" (2009); InvenSense4.

Ward J.R., (2006), "An Annotated Bibliography in Pen Computing and Handwriting Character Recognition"; http://users.erols.com/rwservices/biblio.html.

Benbasat et al., (2002); "An Inertial Measurement Framework for Gesture Recognition and Applications", Springer-Verlag, pp. 9-20.

Prevalent Devices LLC, (2006), "Phraze-It One-Handed Finger-Vowel Digital Texting Method"; www.prevalentdevices.com.

Opera Software ASA, (2009), Mouse Gestures in Opera (Opera Tutorials); http://www.opera.com/browser/tutorials/gestures.

Saffer, Dan "Interactive Gestures: Designing Gestural Interfaces", O'Reilly Press, 2008 Comment: General tutorial book on gestural interfaces including motion gestures such as Wii, hand-gestures, eye-winks, body motions, multi-touch from Fingerworks and iPhone.

Buxton, W., 2009, Haptic Input: Marking Interface, Chapter 13.

Members of the Technical Staff of Bell Telephone Lababoratories., "Transmission Systems for Communications," AT&T, 1959, vol. 2, p. 26-4.

Oda, Ohan, and Feiner, S., "Goblin XNA: A Platform for 3D AR and VR Research and Education," accessed at http://web.archive.org/web/20100316161139/http://graphics.cs.columbia.edu/projects/goblin/, accessed on Sep. 2, 2014, pp. 1-5.

Prentice, S., et al., "Hype Cycle for Human-Computer Interaction," accessed at https://www.gartner.com/doc/1089112/hype-cycle-humancomputer-interaction-, Jul. 22, 2009, pp. 1-2.

"Browser Wars"; accessed at http://en.wikipedia.org/wiki/Browser_wars, downloaded on May 13, 2010, 10 pages.

'Hansen, E., "Building a better computer mouse", accessed at http://news.cnet.com/2100-1023-960408.html, Oct. 2, 2002, 4 pages.

"Gait Analysis", accessed at http://en.wikipedia.org/wiki/Gait_analysis, downloaded May 11, 2010, 15 pages.

GestureTek "GestPoint Gesture Recognition for Presentation Systems", accessed at www.gesturetek.com, downloaded May 18, 2010, 2 pages.

"Machine Gesture and Sign Language Recognition", accessed ar http://www.cse.unsw.edu.au/-waleed/gls-rec/, downloaded on May 11, 2010, 5 pages.

Dawson, M. R., "Gait Recognition", accessed at http://www.doc.ic.ac.uk/teaching/projects/Distinguished02/MarkDawson.pdf, 2002, 75 pages.

"Innovating Opera- 'A New Way Towards E-World'", accessed at http://my.opera.com/sharaddixit/blog, Aug. 23, 2009, 1 page.

"Pointing device gesture", accessed at http://wikipedia.org/wiki/Mouse_gesture, downloaded on May 13, 2010, 3 pages.

Shimada, A. and Taniguchi, R "Gesture Recognition using Sparse Code of Hierarchical SOM", accessed at http://figment.csee.ustedut-sfefilat/ data/papersNVeAT9.35.pdf, 2008, 1 page.

"Mobile Sign Language Recognition" accessed at http://www.cc.gatech.edu/ccg/projects/as1/, dowloaded on May 11, 2010, 2 pages.

"Mapping Gestures to Features", accessed at http://slholmes.org/blog/?p=229, downloaded on May 11, 2010, 7 pages.

* cited by examiner

| Mapped Movement (132) | Code (116) | Application (120') | Features (152) | | | | | | | | | | | |
|---|---|---|---|---|---|---|---|---|---|---|---|---|---|---|
| | | | δx | δy | δz | ½-δx | ½-δy | ½-δz | \|δx\| | \|δy\| | \|δz\| | δx/δt | δz/δt | δy/δt |
| | GP1 | LH / STEERING TOP / WHEEL /DOWN | -1.0 | -1.0 | 0.0 | -1.0 | 0.0 | 0.0 | 1.0 | 1.0 | 0.0 | var | var | var |
| | GP2 | RH / STEERING MID / WHEEL/ UP | -1.0 | 1.0 | 0.0 | 0.0 | 1.0 | 0.0 | 1.0 | 1.0 | 0.0 | var | var | var |
| | GP3 | LH / STEERING MID / WHEEL / DOWN | 1.0 | -1.0 | 0.0 | -1.0 | 0.0 | 0.0 | 1.0 | 1.0 | 0.0 | var | var | var |
| | GP4 | RH / STEERING BOT / WHEEL UP | 1.0 | 1.0 | 0.0 | 1.0 | 0.0 | 0.0 | 1.0 | 1.0 | 0.0 | var | var | var |
| | GP5 | LH / GEAR / REDUCE | 0.0 | -1.0 | -1.0 | 0.0 | -1.0 | 0.0 | 0.0 | 1.0 | 1.0 | var | var | var |
| | GP6 | LH / GEAR/ INCREASE | 0.0 | -1.0 | 1.0 | 0.0 | -1.0 | 0.0 | 0.0 | 1.0 | 1.0 | var | var | var |
| | GP7 | BRAKE / STEPON | 0.0 | -1.0 | 0.0 | 0.0 | -0.5 | 0.0 | 0.0 | 1.0 | 0.0 | var | var | var |
| | GP8 | BRAKE / RELEASE | 0.0 | 1.0 | 0.0 | 0.0 | 0.5 | 0.0 | 0.0 | 1.0 | 0.0 | var | var | var |

USER MOVEMENT INTERPRETATION IN COMPUTER GENERATED REALITY

BACKGROUND

Unless otherwise indicated herein, the materials described in this section are not prior art to the claims in this application and are not admitted to be prior art by inclusion in this section.

A user interface may be used to convert movement by a user into electronic data. The electronic data may then be sent to an application to produce an output. A processor may be configured to use the output from the application to generate an image on a display relating to the electronic data. The image may be useful in a computer generated reality.

SUMMARY

In one example, a method is described for interpreting user movement in computer generated reality. In some examples, the method includes receiving, by a processor, movement data relating to movement of a user interface. In some examples, the method includes defining, by the processor, a coordinate system based on the movement data. In some examples, the method includes mapping, by the processor, the movement data to the coordinate system to produce mapped movement data. In some examples, the method includes determining, by the processor, a feature of the mapped movement data. In some examples, the method includes mapping, by the processor, the feature to a code.

In one example, a device is described for interpreting user movement in computer generated reality. In some examples, the device includes a memory effective to store instructions. In some examples, the device includes a processor in communication with the memory, the processor effective to read the instructions and effective to receive movement data relating to movement of a user interface. In some examples, the processor is further effective to define a coordinate system based on the movement data and map the movement data to the coordinate system to produce mapped movement data. In some examples, the processor is further effective to determine a feature of the mapped movement data and map the feature to a code.

In one example, a system is described for interpreting user movement in computer generated reality. In some examples, the system includes a user interface. In some examples, the user interface is effective to generate movement data relating to movement of the user interface. In some examples, the system includes a memory effective to store instructions, a display, and a processor in communication with the memory, the user interface and the display. In some examples, the processor is effective to read the instructions and effective to receive the movement data. In some examples, the processor is effective to define a coordinate system based on the movement data and map the movement data to the coordinate system to produce mapped movement data. In some examples, the processor is effective to determine a feature of the mapped movement data and map the feature to a code. In some examples, the processor is effective to send the code to the memory and receive application data from the memory in response to the code. In some examples, the processor is effective to generate an image based on the application data and send the image to the display. In some examples, the display is effective to receive the image and display the image.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to user movement interpretation in computer generated reality.

Briefly stated, technologies are generally described for a system for interpreting user movement in computer generated reality. In some examples, the system includes a user interface effective to generate movement data relating to movement of the user interface. In some examples, the system further includes a processor receive the movement data. In some examples, the processor is further effective to define a coordinate system based on the movement data and map the movement data to the coordinate system to produce mapped movement data. In some examples, the processor is further effective to determine a feature of the mapped movement data and to map the feature to a code. In some examples, the processor is further effective to send the code to the application and receive application data from the application in response to the code. In some examples, the processor is further effective to generate an image based on the application data.

Figure 1:
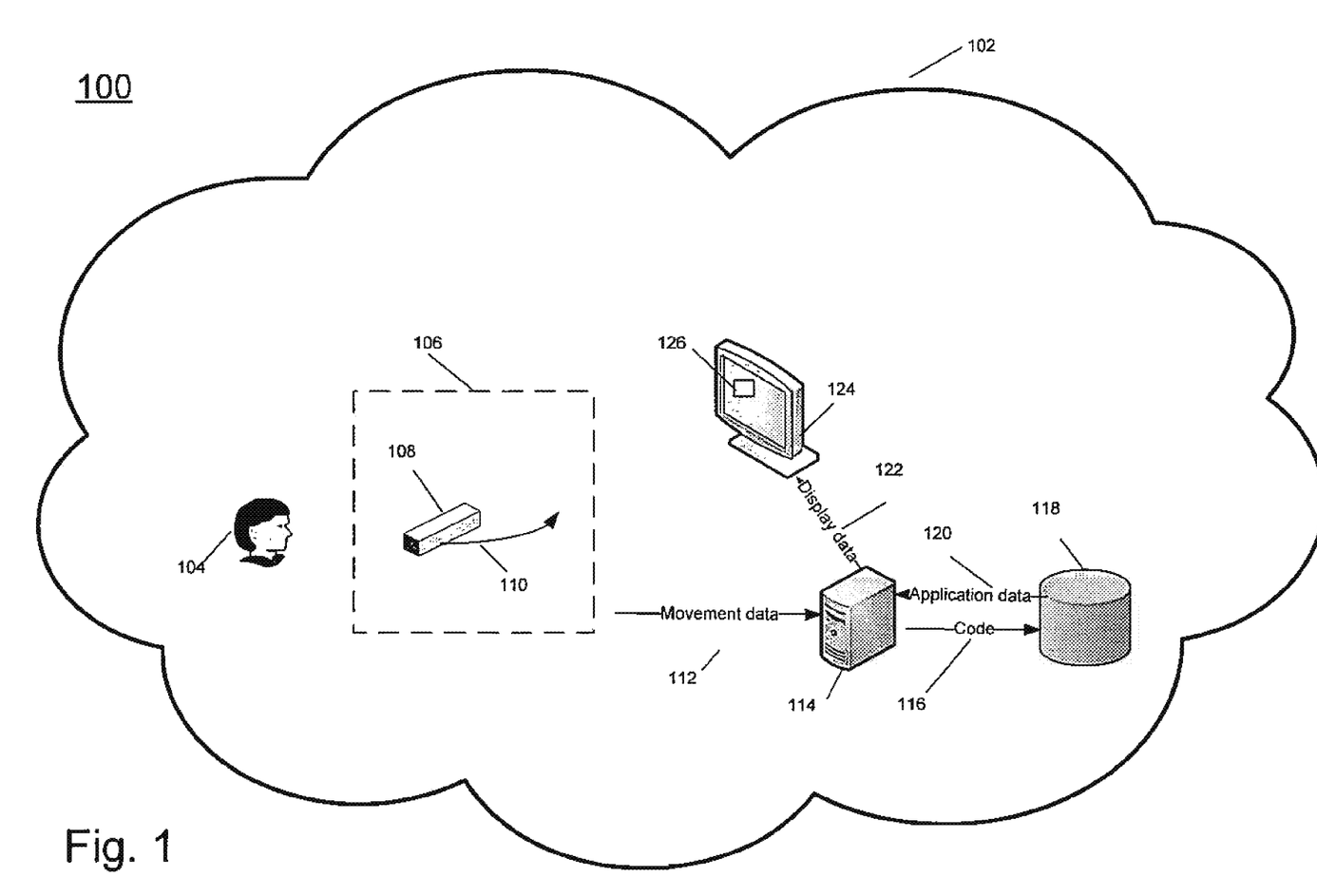
FIG. 1 illustrates an example system that can be utilized to implement user movement interpretation in computer generated reality.

FIG. 1 illustrates an example system that can be utilized to implement user movement interpretation in computer generated reality in accordance with at least some embodiments described herein. In some examples, a system 100 may include a user interface 108, a memory 118 and a display 124 all in communication with a processor 114 over a network 102. As is explained in more detail below, in some examples, when a user 104 moves user interface 108 in space 106 (movement shown by arrow 110, also referred to herein as movement 110), movement data 112 relating to the physical movement may be generated by user interface 108. Movement data 112 may be received by processor 114. In some examples, processor 114 may be in the same housing as user interface 108. In some examples, processor 114 may be in a different housing than user interface 108. In some examples, processor 114 may be configured to map data 112 to a code 116 relating to movement 110. In some examples, processor 114 may be configured to send code 116 to memory 118 and receive application data 120 in response to code 116. In some examples, processor 120 may be configured to generate display data 122 in response to application data 120. Display 124 may be configured to generate an image 126 on display 124 based on display data 122. Image 126 may be related to movement 110.

Figure 2:
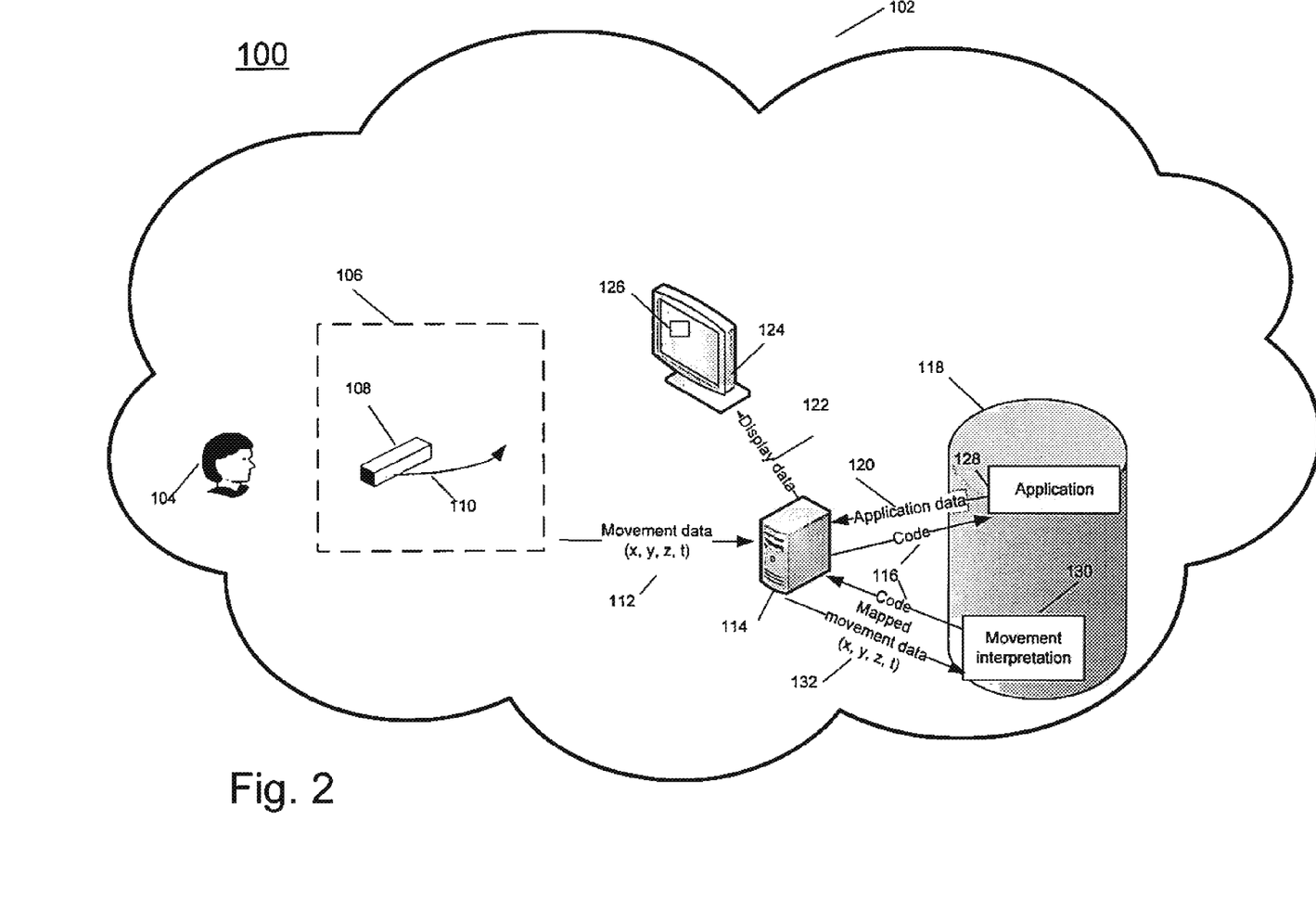
FIG. 2 illustrates an example system that can be utilized to implement user movement interpretation in computer generated reality.

FIG. 2 illustrates an example system that can be utilized to implement user movement interpretation in computer generated reality in accordance with at least some embodiments described herein. The system of FIG. 2 is substantially similar to system 100 of FIG. 1, with additional details. Those components in FIG. 2 that are labeled identically to components of FIG. 1 will not be described again for the purposes of clarity. In addition to the components described above in FIG. 1, memory 118 of system 100 may include instructions relating to an application algorithm 128 and/or a movement interpretation algorithm 130.

As discussed in more detail below, processor 114 may be configured to generate a coordinate system based on movement interpretation algorithm 130. Processor 114 may be configured to map movement data 112 to the coordinate system to produce mapped movement data 132. Processor 114 may be further configured to map features of the mapped movement data 132 to code 116.

User interface 108 may be attached or coupled to various locations on user 104. In some examples, user 104 may be a human. For example, to track a hand movement, one or more user interfaces 108 may be attached around a finger, or around a wrist, or across a palm of a human hand, or attached on a data glove worn by a human, or on any other part of the hand. In some examples, to track a foot movement, one or more user interfaces 108 may be attached around an ankle, or around a foot, or around a toe, or any other part of a human foot. In some examples, to track head movement, one or more user interfaces 108 may be attached on a human forehead area, or an ear, or any other part of the head. In some examples, to track a body movement, one or more user interfaces 108 may be attached to a torso, or any other part of a human body. In some examples, multiple user interfaces may be used. For example, a combination of a first user interface may be used on a user's hand and a second user interface may be used on a user's foot in a car driving game. In some examples, user interface 108 may be a NINTENDO WII MOTIONPLUS controller or a device that uses a INVENSENSE IHU-650 chip.

As mentioned above, in some examples, user interface 108 may be configured to generate movement data 112. In some examples, movement data 112 may include a list of x, y, z triplets corresponding to locations of user interface 108 along x, y and z axes in a Cartesian coordinate system. Data 112 may be sampled by user interface 108 at a frequency that fulfills the Nyquist sampling criterion. In some examples, data 112 may identify multiple locations of user interface 108 at multiple times t.

User 104 may continually move user interface 108. In some examples, processor 114 may be configured to determine when movement 110 by user 104 has terminated. In some examples, processor 114 may be configured to determine that movement 110 has terminated when data 112 at a first time is substantially the same as data 112 at a second time. In other examples, processor 114 may be configured to determine that movement 112 has terminated through other user actions such as depressing of an actuator by user 104 and/or entering a particular code, etc.

Figure 3:
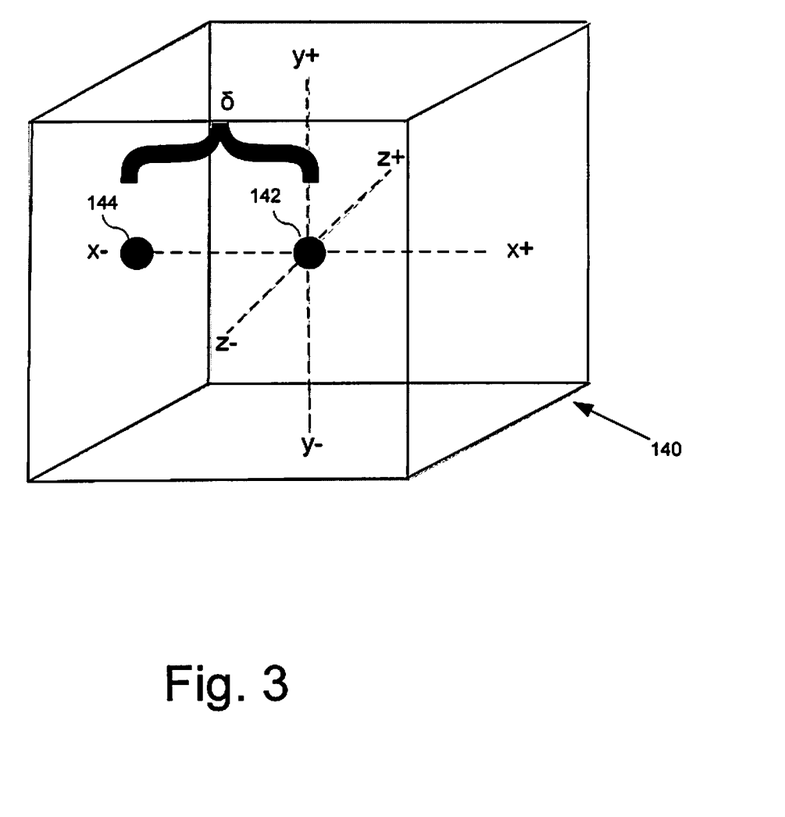
FIG. 3 illustrates an example representation of a coordinate system that can be utilized to implement user movement interpretation in computer generated reality.

FIG. 3 illustrates an example representation of a coordinate system that can be utilized to implement user movement interpretation in computer generated reality in accordance with at least some embodiments described herein.

Referring to FIGS. 2 and 3, processor 114 may be configured to define a coordinate system 140 based on movement interpretation algorithm 130 and movement data 112. For example, movement interpretation algorithm 130 may be adapted to define a cube for coordinate system 140 based on movement data 112. In some examples, coordinate system 140 includes an origin 142 and a final location 144. In some examples, origin 142 may be a starting location of mapped movement data 132 and location 144 may be a final location of mapped movement data 132. In some examples, processor 114 may be configured to calculate a difference $\delta$ between start location 112 and final location 144.

In examples where processor 114 determines that movement 110 has terminated, processor 114 may be configured to map data 112 to coordinate system 140 to produce mapped movement data 132. Processor 114 may further be configured to map mapped movement data 132 to code 116 based on features that characterize mapped movement data 132 in coordinate system 140. In some examples, features may be based on start location 142, final location 144 and difference $\delta$. Difference $\delta$ may relate to a change between start location 142 and final location 144 in space and/or a rate of change in space. Examples of features could include:

$\delta x = xn - x1$ (displacement between origin 142 and final location 144 as measured on the x-axis);

$\delta y = yn - y1$ (displacement between origin 142 and final location 144 as measured on the y-axis);

$\delta z = zn - z1$ (displacement between origin 142 and final location 144 as measured on the z-axis);

$\frac{1}{2} - \delta x = x(n/2) - x1$ (displacement between origin 142 and the geometric midpoint between origin 142 and final location 144 as measured on the x-axis);

$\frac{1}{2} - \delta y = y(n/2) - y1$ (displacement between origin 142 and the geometric midpoint between origin 142 and final location 144 as measured on the y-axis);

$\frac{1}{2} - \delta z = z(n/2) - z1$ (displacement between origin 142 and the geometric midpoint between origin 142 and final location 144 as measured on the z-axis);

$|\delta x| = |x2 - x1| + |x3 - x2| + \ldots + |xn - x(n-1)|$ (the cumulative length of the mapped movement data as projected onto the x-axis);

$|\delta y| = |y2 - y1| + |y3 - y2| + \ldots + |yn - y(n-1)|$ (i.e., the cumulative length of the mapped movement data as projected onto the y-axis);

|δz|=|z2−z1|+|z3−z2|+ . . . +|zn−z(n−1)|(i.e., the cumulative length of the mapped movement data as projected onto the z-axis);

δx/δt=(xn−x1/(tn−t1) (velocity of movement on the x-axis);

δy/δt=(yn−y1 /(tn−t1) (velocity of movement on the y-axis); and

δz/δt=(zn−z1 /(tn−t1) (velocity of movement on the z-axis).

In an example, mapped movement data 132 may start at start location 142 and end at final location 144 having a coordinate triplet (−1, −1, 0) in the coordinate system 140. The examples features identified above would then be δx of −1, a δy of −1, a δz of 0, a ½−δx of −0.5, a ½−δy of −0.5, a ½−δz of 0, a |δx| of 1, a |δy| of 1, and a |δz| of 0.

Figure 4:
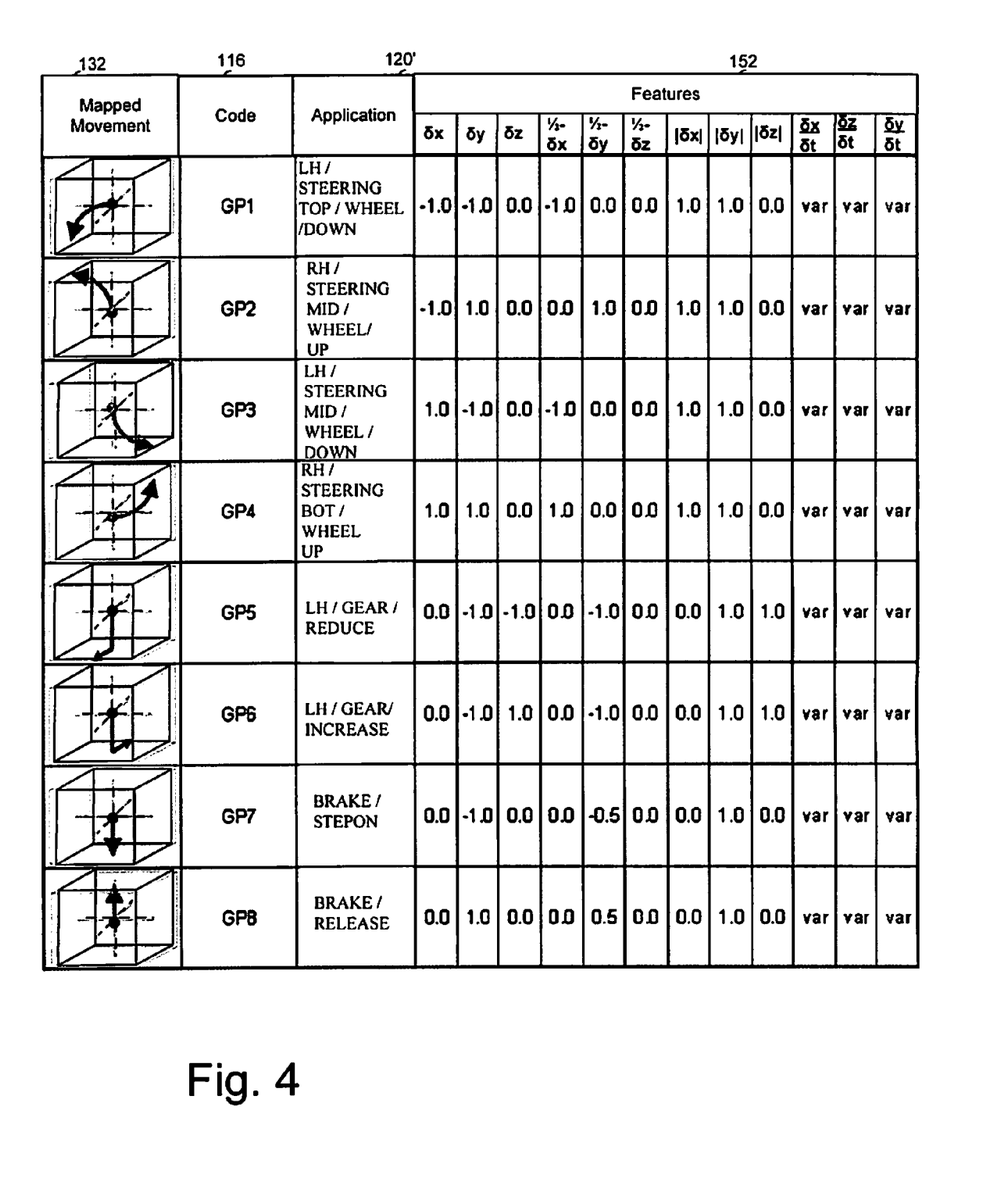
FIG. 4 illustrates an example chart that can be utilized to implement user movement interpretation in computer generated reality.

FIG. 4 illustrates an example chart that can be utilized to implement user movement interpretation in computer generated. reality in accordance with at least some embodiments described herein.

In some examples, portions of a chart 150 may be stored in memory 118. As shown, chart 150 may include fields such as mapped movement data 132, code 116, representation of application data 120', and/or features 152. As discussed above, features 152 may characterize mapped movement data 132 in coordinate system 140. For example, in each row of data in chart 150, mapped movement data 132 is illustrated along with corresponding features 152. In the first row, the features are δx=−1.0, δy=−1.0 δz=0.0, etc. Features based on velocity such as δx/δt may have variable values as indicated by "var".

As mentioned above, processor 114 may be configured to map features 152 to code 116. In the example shown for features 152 in the first row of chart 150, code 116 is "GP1". Referring also to FIG. 2, as discussed above, processor 114 may be configured to send code 116 with a value of "GP1" to application 128 and receive application data 120 in response. An example of a representation of application data 120' is shown in chart 150. In the example, representation of application data 120' relates to movement of a virtual car ("LH/Steering Top/Wheel/Down"). Velocity δx/δt may be variably controlled such that different values of the velocity feature may produce different application data 120, Continuing with the reference to the first row, in the example, code "GP1" may correspond to steering of a virtual steering wheel.

Figure 5:
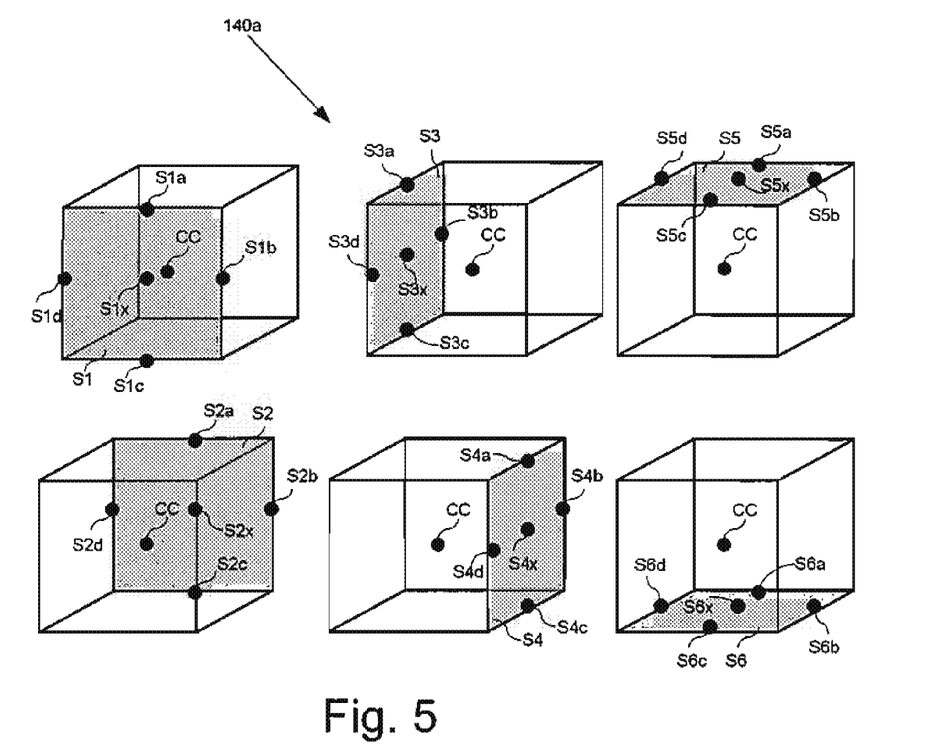
FIG. 5 illustrates an example representation of a coordinate system that can be utilized to implement user movement interpretation in computer generated reality.

FIG. 5 illustrates an example representation of a coordinate system that can be utilized to implement user movement interpretation in computer generated reality in accordance with at least some embodiments described herein. In some examples, processor 114 may be adapted to define a coordinate system 140a based on movement interpretation algorithm 130 and movement data 112. For example, coordinate system 140a may include a cube with six sides. In some examples, each side may include a center "x", a top edge "a", a right edge "b", a bottom edge "c", and/or a left edge "d". For example, side 1 "S1" includes a center S1x, a top edge "S1a", a right edge "S1b", a bottom edge "S1c", and/or a left edge "S1d".

In some examples, movement interpretation algorithm 130 may be adapted to define a side pair including two square sides. In some examples, the two square sides may be parallel. For example, a side pair Z, which could correspond to a z axis, may include side S1 and side S2. A side pair X, which could correspond to an x axis, may include side S3 and side S4. A side pair Y, which could correspond to a y axis, could include side S5 and side S6.

In examples where processor 114 determines that movement 110 has terminated, processor 114 may be configured to map movement data 112 to coordinate system 140a to produce mapped movement data 132. Processor 114 may be configured to determine features of mapped movement data 132 in coordinate system 140a. In some examples, features of mapped movement data 132 may be determined when mapped movement data 132 intersects an edge or a center of a side in coordinate system 140a. In an example, when mapped movement data 132 indicates that movement 110 intersects a top edge of side 1, the corresponding feature determined by processor 114 may be "S1a". Processor 114 may be configured to map the feature "S1a" to code 116. Code 116 may be based on and/or may be equal to a value of the features. Processor 114 may be configured to map features corresponding to the same edges shared by multiple sides to the same code 116. For example, features defined by edge S1a may be mapped to the same code 116 as edge S5c, etc.

Figure 6:
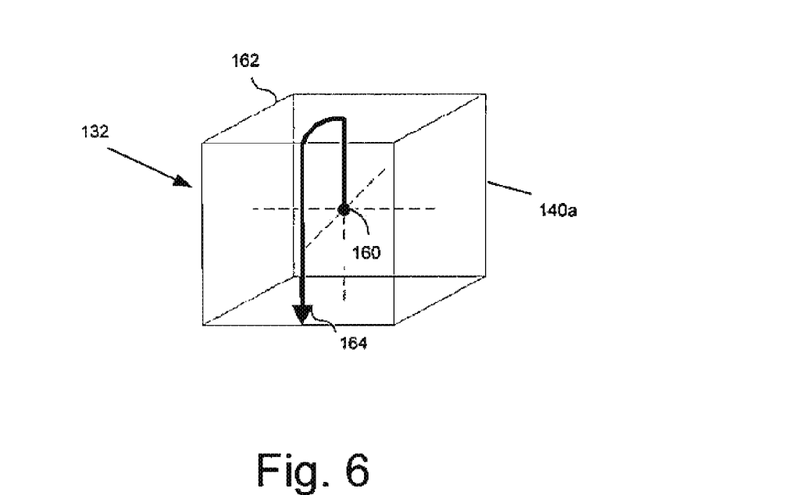
FIG. 6 illustrates an example representation of a coordinate system that can be utilized to implement user movement interpretation in computer generated reality.

FIG. 6 illustrates an example representation of a coordinate system that can be utilized to implement user movement interpretation in computer generated reality in accordance with at least some embodiments described herein. As shown in the example, processor 114 may be configured to define coordinate system 140a based on data 112. Processor 114 may be configured to map movement data 112 to coordinate system 140a to produce mapped movement data 132. Processor 114 may be configured to determine features of mapped movement data 132 where mapped movement data 132 intersects an edge or a side of coordinate system 140a. Processor 114 may be configured to map mapped movement data 132 to code 116 based on the features. In the example, a middle of side 5 "S5x", a bottom of side 5 "S5c" and a bottom of side 6 "S6c" are identified as intersecting mapped movement data 132. In the example, the features may thus be S5x-S5c-S6c. In the example, processor 114 may be configured to map mapped movement data 132 to a code 116 with a value of "S5x-S5c-S6c".

Among other possible benefits, a system in accordance with this disclosure may be scalable to increased degrees of freedom with linear computational costs. A frame of reference may be generated allowing for tracking of movement for any time duration. Multi-dimensional movement may be interpreted. Moreover, similar movements may be mapped to the same code.

Figure 7:
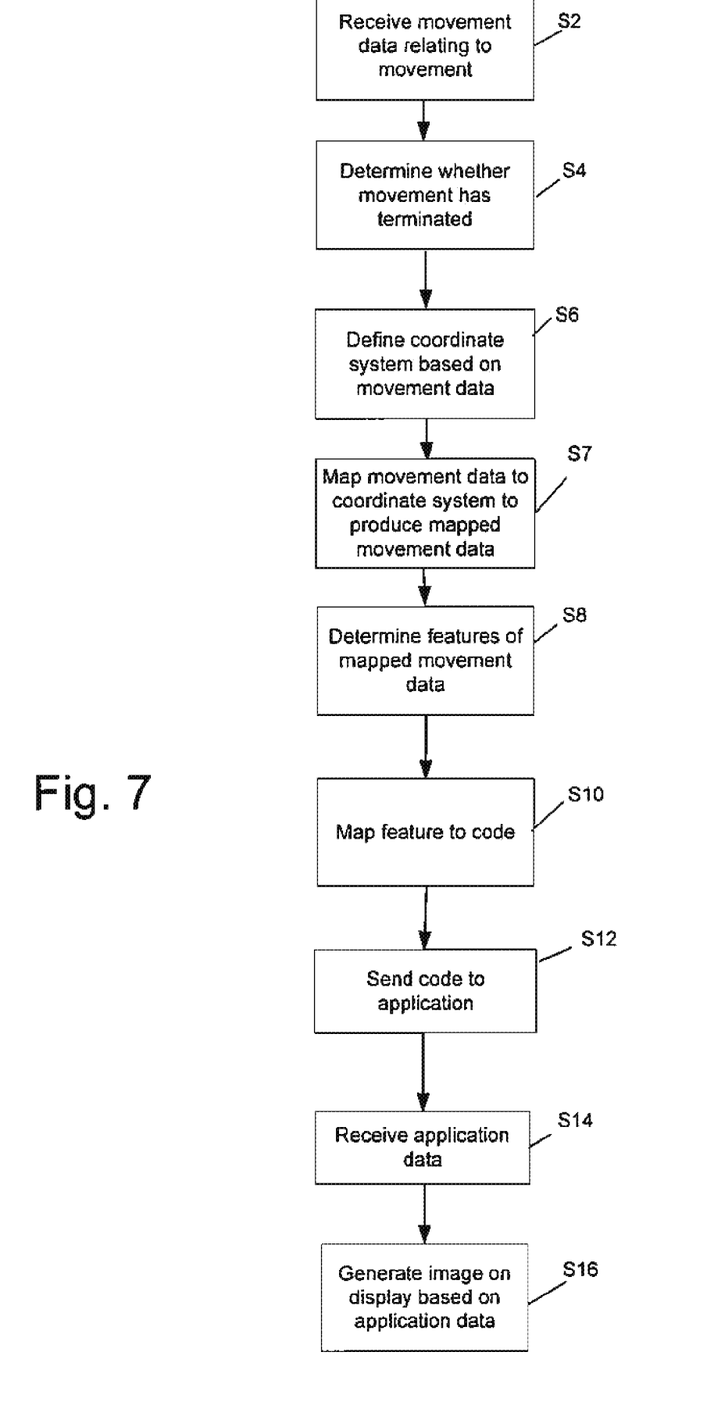
FIG. 7 depicts a flow diagram of an example process for user movement interpretation in computer generated reality.

FIG. 7 depicts a flow diagram of an example process for user movement interpretation in computer generated reality arranged in accordance with at least some embodiments described herein. The process in FIG. 7 could be implemented using, for example, system 100 discussed above. An example process may include one or more operations, actions, or functions as illustrated by one or more of blacks S2, S4, S6, S7, S8, S10, S12, S14 and/or S16. Although illustrated as discrete blocks, various blocks may be divided into additional blocks, combined into fewer blocks, or eliminated, depending on the desired implementation. Processing may begin at block S2.

At block S2, a processor may be configured to receive movement data relating to movement of a user interface. Processing may continue from block S2 to block S4.

At block S4, the processor may be configured to determine whether a movement has terminated. Processing may continue from block S4 to block S6.

At block S6, the processor may be configured to define a coordinate system based on the movement data. Processing may continue from block S6 to block S7.

At block S7, the processor may be configured to map the movement data to the coordinate system to produce mapped movement data. Processing may continue from block S7 to block S8.

At block S8, the processor may be configured to determine features of the mapped movement data. In some examples, the features may be changes in the mapped movement data from a starting location to a final location. In some examples, the features may relate to intersections between the mapped movement data and edges or centers of the coordinate system. Processing may continue from block S8 to block S10.

At block S10, the processor may be configured to map the features to a code. Processing may continue from block S10 to block S12.

At block S12, the processor may be configured to send the code to an application. Processing may continue from block S12 to block S14.

At block S14, the processor may be configured to receive application data. Processing may continue from block S14 to block S16.

At block S16, the processor may be configured to generate an image on a display based on the application data.

Figure 8:
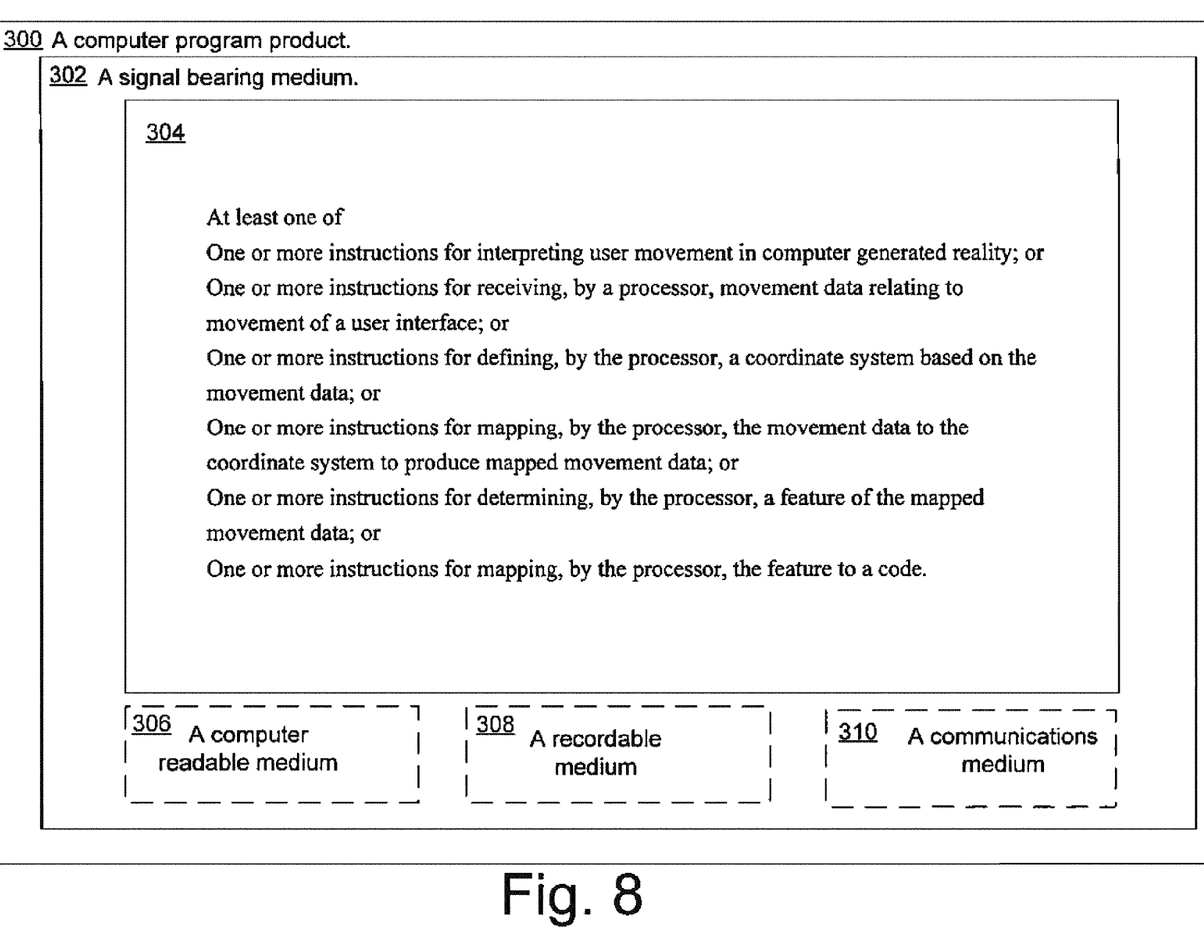
FIG. 8 illustrates a computer program product for user movement interpretation in computer generated reality.

FIG. 8 illustrates a computer program product 300 for user movement interpretation in computer generated reality arranged in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-7. Thus, for example, referring to system 100, processor 114 may undertake one or more of the blocks shown in FIG. 8 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 9:
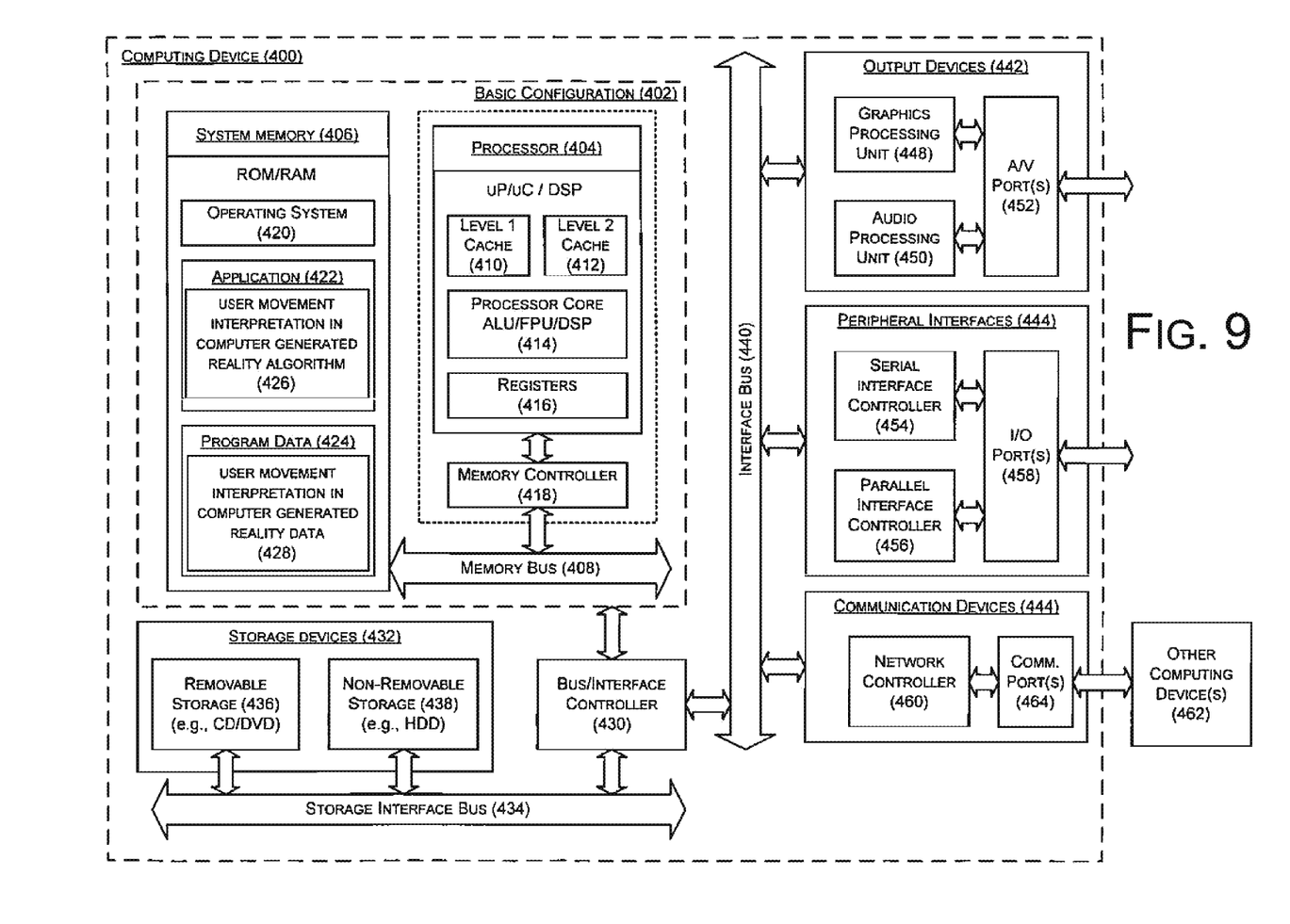
FIG. 9 is a block diagram illustrating an example computing device that is arranged to perform user movement interpretation in computer generated reality; all arranged in accordance with at least some embodiments described herein.

FIG. 9 is a block diagram illustrating an example computing device 400 that is arranged to perform user movement interpretation in computer generated reality in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include a user movement interpretation in computer generated reality algorithm 426 that is arranged to perform the functions as described herein including those described previously with respect to FIGS. 1-8. Program data 424 may include user movement interpretation in computer generated reality data 428 that may be useful for a user movement interpretation in computer generated reality algorithm as is described herein. In some embodiments, application 422 may be arranged to operate with program data 424 on operating system 420 such that a user movement interpretation in computer generated reality algorithm may be provided. This described basic configuration 402 is illustrated in FIG. 5 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for interpret user movement in computer generated reality, the method comprising:
receiving, by a processor, movement data relating to movement of a user interface;
defining, by the processor, a coordinate system based on the movement data; the three dimensional coordinate system including a first, second and third dimension, and the three dimensional coordinate system including a cube having six sides, each side having a center and four respective edges;
mapping, by the processor, the movement data to the three dimensional coordinate system to produce mapped movement data;
determining, by the processor, a start location, a final location, a path between the start and final location, and at least one intermediate location between the start location and the final location along the path, of the mapped movement data in the coordinate system, the final location representing a change in user movement from the start location in the first dimension, in the second dimension and in the third dimension, wherein a first line between the start location and the intermediate location is different from a second line between the start location and the final location;
determining, by the processor, a feature of the mapped movement data based on the path, the mapped movement data, a first intersection between one of the edges of the cube and the mapped movement data, a second intersection between one of the centers of one of the sides of the cube in the coordinate system and the mapped movement data, and a difference between the start location and the final location; and
mapping, by the processor, the feature to a code.

2. The method as recited in claim 1, further comprising:
sending, by the processor, the code to an application;
receiving, by the processor, application data from the application in response to the code; and
generating, by the processor, an image based on the application data.

3. The method as recited in claim 1, wherein the difference includes a change of the mapped movement data in space and a rate of change of the mapped movement data in space.

4. A device for interpreting user movement in computer generated reality, the device comprising:
a memory effective to store instructions;
a processor in communication with the memory, the processor effective to read the instructions and effective to
receive movement data relating to movement of a user interface;
define a three dimensional coordinate system based on the movement data, the three dimensional coordinate system including a first, second and third dimension, and the three dimensional coordinate system including a cube having six sides, each side having a center and four respective edges;
map the movement data to the three dimensional coordinate system to produce mapped movement data;
determine a start location, a final location, a path between the start and final location, and at least one intermediate location between the start location and the final location along the path, of the mapped movement data in the coordinate system, the final location representing a change in user movement from the start location in the first dimension, in the second dimension and in the third dimension, wherein a first line between the start location and the intermediate location is different from a second line between the start location and the final location;
determine a feature of the mapped movement data based on the path, the mapped movement data, a first intersection between one of the edges of the cube and the mapped movement data, a second intersection between one of the centers of one of the sides of the cube in the coordinate system and the mapped movement data, and a difference between the start location and the final location; and
map the feature to a code.

5. The device as recited in claim 4, wherein:
the memory is further effective to store an application; and
the processor is further effective to
send the code to the application;
receive application data from the application in response to the code; and
generate an image based on the application data.

6. The device as recited in claim 4, wherein the difference includes a change of the mapped movement data in space and a rate of change of the mapped movement data in space.

7. A system for interpreting user movement in computer generated reality, the system comprising:
a user interface, wherein the user interface is effective to generate movement data relating to movement of the user interface;
a memory effective to store instructions;
a display;
a processor in communication with the memory, the user interface and the display, wherein the processor is effective to read the instructions and effective to
receive the movement data;
define a three dimensional coordinate system based on the movement data, the three dimensional coordinate system including a first, second and third dimension, and the three dimensional coordinate system including a cube having six sides, each side having a center and four respective edges;
map the movement data to the three dimensional coordinate system to produce mapped movement data;
determine a start location, a final location, a path between the start and final location, and at least one intermediate location between the start location and the final location along the path, of the mapped movement data in the coordinate system, the final location representing a change in user movement from the start location in the first dimension, in the second dimension and in the third dimension, wherein a first line between the start location and the intermediate location is different from a second line between the start location and the final location;
determine a feature of the mapped movement data based on the path, the mapped movement data, a first intersection between one of the edges of the cube and the mapped movement data, a second intersection between one of the centers of one of the sides of the cube in the coordinate system and the mapped movement data, and a difference between the start location and the final location;
map the feature to a code;
send the code to the memory;
receive application data from the memory in response to the code;
generate an image based on the application data; and
send the image to the display; and wherein the display is effective to receive the image and display the image.

8. The system as recited in claim 7, wherein the difference includes a change of the mapped movement data in space and a rate of change of the mapped movement data in space.

* * * * *

UNITED STATES PATENT AND TRADEMARK OFFICE
CERTIFICATE OF CORRECTION

| | | |
|---|---|---|
| PATENT NO. | : 8,966,400 B2 | Page 1 of 1 |
| APPLICATION NO. | : 12/795110 | |
| DATED | : February 24, 2015 | |
| INVENTOR(S) | : Yeap | |

It is certified that error appears in the above-identified patent and that said Letters Patent is hereby corrected as shown below:

On the Title Page

On Page 2, Item (56), under "OTHER PUBLICATIONS", in Column 1, Line 2, delete "Hierarchial" and insert -- Hierarchical --, therefor.

In the Specification

In Column 5, Lines 17-18, delete "generated." and insert -- generated --, therefor.

In Column 5, Line 42, delete "data 120," and insert -- data 120. --, therefor.

In Column 6, Line 50, delete "blacks" and insert -- blocks --, therefor.

In the Claims

In Column 11, Line 2, in Claim 1, delete "for interpret" and insert -- to interpret --, therefor.

In Column 11, Line 6, in Claim 1, delete "a coordinate" and insert -- a three dimensional coordinate system --, therefor.

In Column 11, Line 7, in Claim 1, delete "data;" and insert -- data. --, therefor.

Signed and Sealed this
Twenty-eighth Day of July, 2015

Michelle K. Lee
*Director of the United States Patent and Trademark Office*